United States Patent
Lau et al.

(10) Patent No.: US 6,625,121 B1
(45) Date of Patent: *Sep. 23, 2003

(54) DYNAMICALLY DELISTING AND RELISTING MULTICAST DESTINATIONS IN A NETWORK SWITCHING NODE

(75) Inventors: Onchuen Lau, Saratoga, CA (US); Gene Chui, Campbell, CA (US); Gary Kipnis, Sunnyvale, CA (US); Gurmohan Samrao, San Jose, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/301,519

(22) Filed: Apr. 28, 1999

(51) Int. Cl.[7] .................................................. H04J 1/16
(52) U.S. Cl. ................... 370/230; 370/395.72; 370/412
(58) Field of Search ................................ 370/230, 389, 370/390, 239, 232, 429, 428, 414, 397, 418, 412, 254, 392, 395.1, 398, 395.72, 395.71; 709/234; 710/57

(56) References Cited

U.S. PATENT DOCUMENTS

| | | | |
|---|---|---|---|
| 4,626,624 A | | 12/1986 | Daisenberger ............... 379/137 |
| 5,067,074 A | | 11/1991 | Farel et al. .................. 709/235 |
| 5,295,183 A | | 3/1994 | Langlois et al. ........ 379/112.04 |
| 5,313,454 A | | 5/1994 | Bustini et al. ............... 370/231 |
| 5,359,592 A | | 10/1994 | Corbalis et al. ............. 370/233 |
| 5,473,604 A | | 12/1995 | Lorenz et al. ............... 370/229 |
| 5,519,690 A | | 5/1996 | Suzuka et al. ............. 370/395.3 |
| 5,724,358 A | * | 3/1998 | Headrick et al. ............ 370/418 |
| 6,018,519 A | | 1/2000 | Ginzboorg .................. 370/236 |
| 6,094,435 A | * | 7/2000 | Hoffman et al. ............. 370/414 |
| 6,154,446 A | * | 11/2000 | Kadambi et al. ............ 370/239 |
| 6,356,629 B1 | | 3/2002 | Fourie et al. ............. 379/112.1 |

OTHER PUBLICATIONS

Mito, M. et al; "B–ISDN Signalling Protocol Processing for Large Multiplexed Subscriber System," 1995 IEEE International Conference on Communications. Converging Technologies for Tomorrow's Applications. ICC '96. Proceedings of ICC/SUPERCOMM '96—International Conference on Communications, Dallas, TX, USA, pp. 663–668 vol. 2, XP002140624 1996.

ATM User–Network Interface Specification, V.3.0, 1993, Sec.s: 3.4.5; 3.6.1.3; 3.6.2.5; 3.6.3.2.6; and , 3.6.3.3.

* cited by examiner

Primary Examiner—Hassan Kizou
Assistant Examiner—John Pezzlo
(74) Attorney, Agent, or Firm—Blakely, Sokoloff, Taylor & Zafman LLP

(57) ABSTRACT

An apparatus and method for reducing congestion in a network switching node. A congestion mask that indicates which of a plurality of destination ports in a network switching node are congested is generated and combined with a destination port field included in a packet in a multicast queue of the switching node to mask destination port designations in the destination port field that are indicated by the congestion mask to be congested if a drop eligibility field within the packet indicates that destination port designations are permitted to be masked. The packet is dequeued from the multicast queue to be forwarded to destination ports in the network switching node indicated by destination port designations in the destination port field not masked by the combination of the congestion mask with the destination port field.

39 Claims, 8 Drawing Sheets

DYNAMICALLY DELISTING AND RELISTING MULTICAST DESTINATIONS IN A NETWORK SWITCHING NODE

FIELD OF THE INVENTION

The present invention relates to the field of packet-switched communications, and more particularly to processing multicast traffic in a network switch node.

BACKGROUND OF THE INVENTION

The performance of packet switching devices is often limited by the finite buffering they can provide for the data objects passing through them. In a switch for an Asynchronous Transfer Mode (ATM) network, for example, ATM cells typically must be queued in one or more ingress queues of the switch before being forwarded to their destinations. Cells destined for a congested destination continue to occupy space in the ingress queues until the destinations can accept more cells. Consequently, when one or more destinations become congested, the finite queuing resources of the switch can quickly be exceeded, crippling the throughput of the switch.

One particularly undesirable phenomenon, known as head-of-line blocking, occurs when a cell must wait at the head of an ingress queue for its destination to become uncongested, blocking other cells in the ingress queue from being forwarded to uncongested destinations. One technique for reducing head-of-line blocking is to queue incoming cells in separate ingress queues according to their destinations. By this arrangement, called "virtual output queuing," head of line blocking is avoided for those cells or other data objects destined for only one destination (i.e., unicast traffic). If a destination becomes congested, only the cells enqueued in the ingress queue directed to that destination are affected and cells in other ingress queues may continue to be forwarded to uncongested destinations.

Unfortunately, virtual output queuing is less effective for multicast traffic (i.e., cells or other data objects destined for two or more destinations). Although a multicast cell may be enqueued in multiple ingress queues, one for each multicast destination, this multiplication of cells consumes precious additional switching resources and may cause cell-ordering problems. Alternatively, a separate ingress queue may be provided for each different combination of possible destinations. As a practical matter, however, such an implementation is usually limited to switches having a relatively small number of destinations, considering that the number of required ingress queues increases exponentially with the number of destinations. Because of these complications, many prior art switches simply tolerate or drop multicast cells that cause head-of-line blocking.

SUMMARY OF THE INVENTION

A method and apparatus for reducing congestion in a network switching node are disclosed. Destination port designations that correspond to congested destinations in the switching node are masked from a destination port field included in a first packet in a multicast queue of the switching node if a drop eligibility value within the packet indicates that destination port designations may be masked. The first packet is dequeued from the multicast queue to be forwarded to destination ports indicated by unmasked destination port designations in the destination port field, permitting advance of other packets in the multicast queue.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

According to embodiments described herein, each cell entering a network switch is tagged with a value called a drop eligible rank (DER) according to the priority of the traffic category to which the cell belongs. If a multicast cell destination is determined to be congested and if the DER associated with-the multicast cell exceeds a threshold (i.e., if the cell is "drop eligible"), then the congested destination is removed from the list of requested multicast destinations for the cell. This is referred to as "delisting" the destination. In a preferred embodiment, destination delisting is non-destructive as to a destination field within the cell so that if the congested destination becomes uncongested before the multicast cell is dequeued for forwarding, the original destination field is available to restore the previously congested destination to the list of requested destinations for the cell. That is, the destination is. "relisted."

By delisting destinations in multicast cells based on cell DER and instantaneous congestion conditions in the switch, a substantial number of requests to forward multicast cells to congested destinations can be avoided. Thus, instead of backing up in the multicast queue, cells for which one or more congested destinations have been delisted, can be forwarded to the remaining listed destinations, permitting advance of other cells in the multicast queue. Because destination delisting and relisting is dynamic, the technique provides for real-time diversion of switching resources to higher priority traffic during intermittent and short-lived congestion conditions and for restoring switching resources to lower priority traffic when congestion eases.

Figure 1:
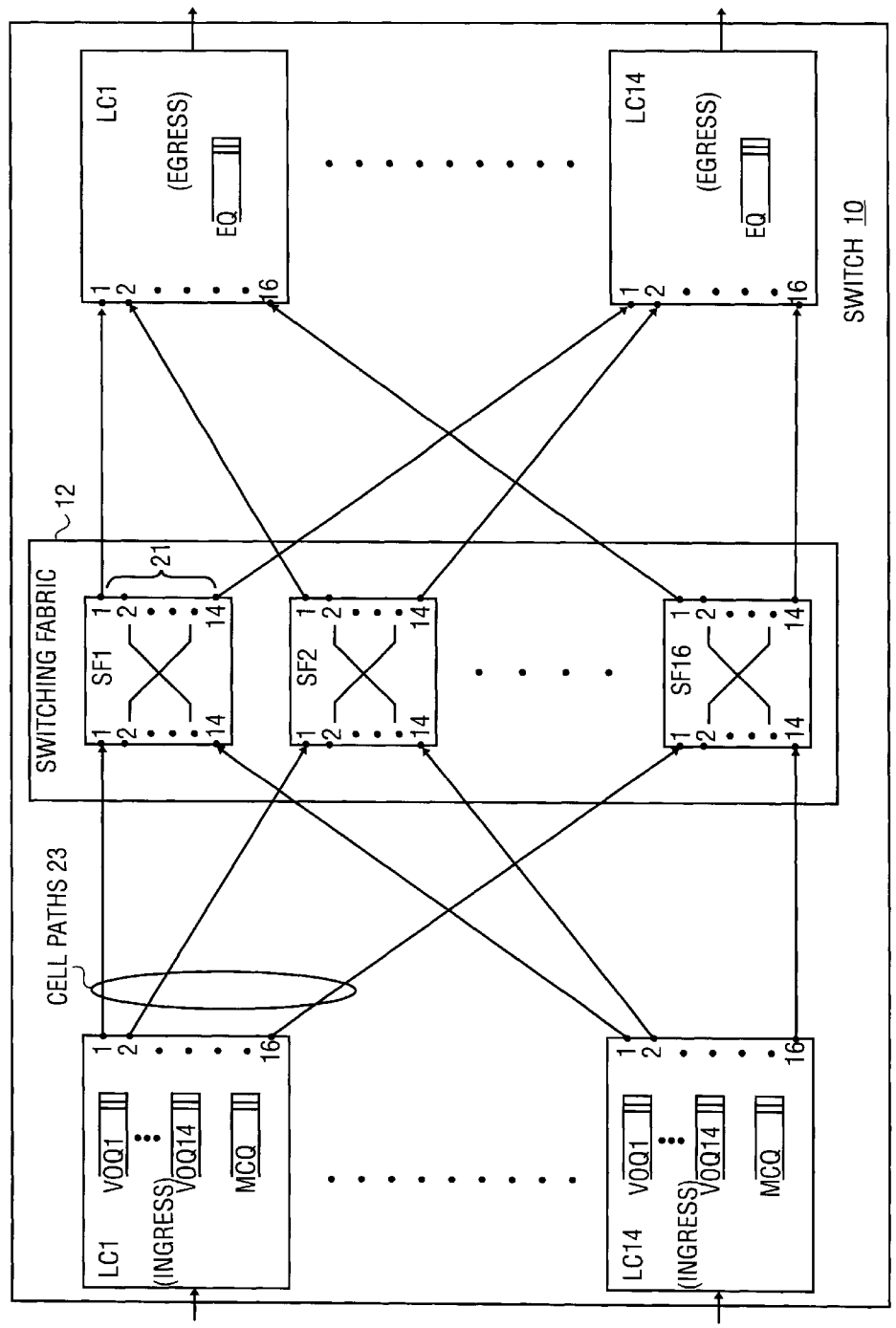
FIG. 1 illustrates an exemplary network switching node.

FIG. 1 illustrates an exemplary network switching node 10 that includes fourteen line cards (LC1–LC14) coupled to a switching fabric formed by sixteen switching units (SF1–SF16). Each line card is shown on both sides of the switching fabric to emphasize the direction of data flow from ingress queues (VOQ1–VOQ14, MCQ) to an egress queue (EQ), but this is for illustration purposes only. Although ingress and egress queues may be placed on separate line cards, in a preferred embodiment each line card contains both ingress and egress queues.

For the purpose of discussion, the network switching node 10 is described herein as an ATM switch 10 used to forward ATM cells from line card to line card according to destination information contained in the ATM cells. In alternate embodiments, the switch 10 may be a router or bridge or any other device for forwarding packetized data objects between ingress and egress points based on destination information contained in the packetized data objects. For example, the switch 10 may be a frame relay switch for switching frame relay frames, a router or bridge for routing internet protocol (IP) packets or any other device for switching higher or lower layered data objects.

Still referring to FIG. 1, the individual line cards (LC1–LC14) are coupled to network transmission lines that supply incoming ATM cells. Each incoming ATM cell includes a virtual connection identifier/virtual path identifier (VCI/VPI) field that indicates a communication path through each switching node in the network, including the switch 10. The communication path is referred to as a "virtual connection" because it represents a connection between endpoints on the network that is defined by logical information in the cells themselves rather than by the physical media used to carry the cells.

In one embodiment, each of the sixteen switching units (SF1–SF16) of the switching fabric 12 independently switches one cell from an ingress port (VOQ1–VOQ14, MCQ) to one or more egress ports (EQ) during a time interval called a connection cycle. The switching units may be formed by one or more cross bar switches, by a shared memory switch or by any other switching circuitry for establishing connections for forwarding packetized data objects.

Each switching unit,(SF1–SF16) includes fourteen ports 21 that are coupled to the fourteen line cards (LC1–LC14), respectively. From the perspective of the ingress queues on the individual line cards, these fourteen ports 21 represent the possible destination ports in the switch 10. In alternate embodiments there may be more or fewer destination ports based on the number of line cards present in the switch 10 and based on the number of different destinations per line card. The sixteen paths between the switching fabric 12 and each line card constitute cell paths 23 for transferring cells between the line card and the switching fabric 12. Because each of the switching units (SF1–SF16) is capable of forwarding only one cell per connection cycle (meaning that the switching fabric 12 can forward a total of 16 cells at a time) and because there may be as many as 14×16=224 forwarding requests per connection cycle, the switching fabric 12 may be unable to satisfy all the forwarding requests in a given connection cycle. In one implementation, arbitration logic is provided within the switching fabric 12 to arbitrate between the forwarding requests from the different line cards, granting some requests and denying others. In an alternate implementation, a higher bandwidth switching fabric may be used so that a larger number of cells may be forwarded per connection cycle and little or no arbitration is required.

According to one embodiment, each line card includes a plurality of virtual output queues (VOQ1–VOQ14) for queuing ingress unicast cell traffic, a multicast queue (MCQ) for queuing ingress multicast cell traffic, and at least one egress queue (EQ). Each of the virtual output queues is used to queue unicast cells destined for a respective one of the fourteen destination ports 21. Although each line card is depicted in FIG. 1 as including fourteen virtual output queues, at least one virtual output queue may be omitted in an alternate embodiment because there are only thirteen line cards to which cells on a given line card need to be forwarded; generally, cells do not need to be forwarded to the egress queue on the line card at which they are received except in special circumstances (e.g., diagnostic operation).

Figure 2:
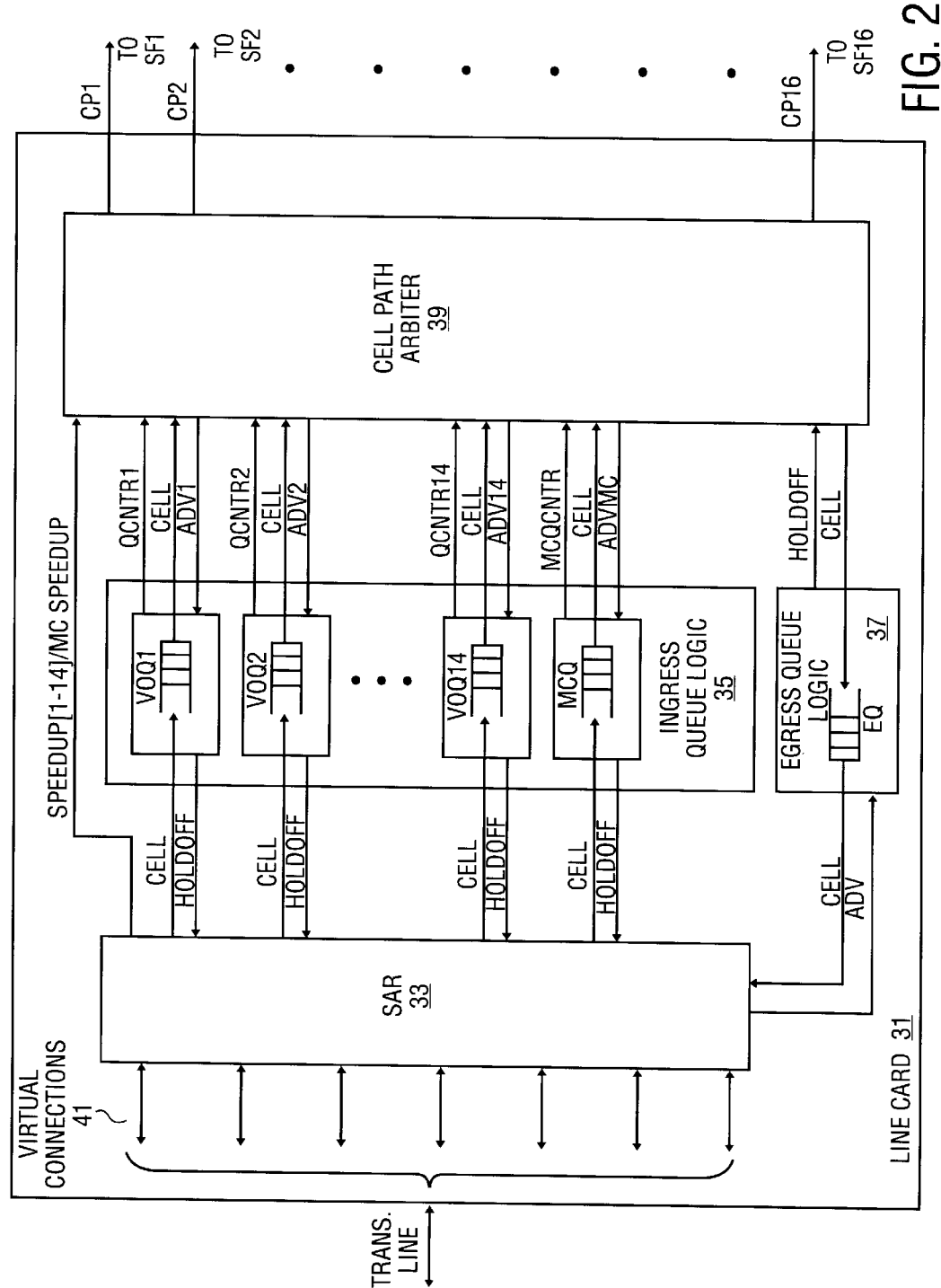
FIG. 2 illustrates a line card 31 according to one embodiment.

FIG. 2 illustrates a line card 31 according to one embodiment. The line card 31 includes four main functional units: a segmentation and reassembly engine 33 (SAR 33) that receives and transmits cells via the virtual connections 41 through a physical transmission line; ingress queue logic 35 that includes virtual output queues (VOQ1–VOQ14) and a multicast queue (MCQ); egress queue logic 37 that includes an egress queue (EQ); and a cell path arbiter 39 that manages access to the cell paths (CP1–CP16). The SAR 33 is implemented differently depending on the type of traffic being switched. For example, if frame relay packets (or other variable length data objects) are being switched; the SAR 33 is used to segment incoming frame relay packets into fixed length cells which are then supplied to the ingress queue logic 35. Conversely, the SAR 33 reassembles the fixed length cells received from the egress queue logic 37 into frame relay frames (or other data objects). In the case of ATM cells, the SAR 33 does not segment the cells, but rather modifies the header field of each incoming cell based on its VCI/VPI field. According to one embodiment, the SAR 33 writes a DER and a destination port mask into a user definable field of the each incoming cell. The DER is formed by as many bits as required to represent the different categories of traffic and, in at least one implementation, is a single bit that indicates whether the cell is drop eligible or not. For example, constant bit rate traffic (CBR), such as voice and video, may be assigned a DER of one (1) to indicate that it is drop eligible, while traffic that cannot be dropped (e.g., bursty data) is assigned a DER of zero. The destination port mask indicates the destination port or ports for the cell. In one embodiment, the destination port mask is determined for a given cell by indexing a table of destination ports based on a hash value generated from the VCI/VPI field in the cell. The table is itself generated by inspecting the source addresses of incoming cells to learn which network destinations are connected to which line cards in the switch. In the case of a unicast cell, only one destination port is designated in the destination port mask. In the case of a multicast cell, the destination port mask is referred to as a multicast port mask and includes two or more destination port designations.

Still referring to FIG. 2, the SAR 33 distributes each incoming cell to one of the virtual output queues (VOQ1–VOQ14) or the multicast queue (MCQ) according to the cell's destination port mask. Cells that contain a multicast port mask are queued in the multicast queue, while all other cells are queued in the virtual output queue that corresponds to the cell destination. If a virtual output queue or the multicast queue is unable to accept cells from the SAR 33 it asserts a holdoff signal (HOLDOFF) to the SAR 33. The SAR 33 treats a holdoff signal from a virtual output queue as an indication that the corresponding destination port is congested and responds by asserting a speedup signal to the cell path arbiter 39 requesting the cell path arbiter 39 to give priority to the corresponding virtual output queue. A separate speedup signal (SPEEDUP[1–14]) is provided for each virtual output queue. Similarly, if the multicast queue asserts holdoff, the SAR 33 asserts a multicast speedup signal (MC SPEEDUP) to the cell path arbiter 39. The cell path arbiter 39 uses the speedup signals for the different virtual output queues and the multicast queue in prioritizing switching requests to the switching fabric. This operation is discussed in greater detail below.

Cells at the heads of the virtual output queues (VOQ1–VOQ14) and the multicast queue (MCQ) are supplied to the cell path arbiter 41 along with respective queue counter values (QCNTR[1–14] and MC QCNTR) that indicate the number of queued cells queued. The cell path arbiter 39 issues advance signals (ADV1–14 and MC ADV) to the virtual output queues and the multicast queue to cause cells to be dequeued for transmission to the switching fabric via one of the cell paths CP1–CP16. According to one embodiment, the cell path arbiter 39 issues forwarding requests to the switching fabric on behalf of the virtual output queues and the multicast queue according to the number of cells queued in each queue and based on the relative priority of the different requests. The switching fabric responds by granting (i.e., issuing a "grant") or denying the requests. Thus, the number of cells forwarded to the switching fabric by a given line card may change from one connection cycle to the next. Further, grants to a line card need not be evenly distributed among the different queues of the ingress queue logic 35. For example, in one connection cycle, a single virtual output queue, say VOQ1, could receive sixteen grants, while no grants are received for the other virtual output queues or the multicast queue. In another connection cycle, the multicast queue (MCQ) may receive sixteen grants, while none are received by the virtual output queues. In another connection cycle, the grants may be more evenly distributed among the virtual output queues and the multicast queue.

Figure 3:
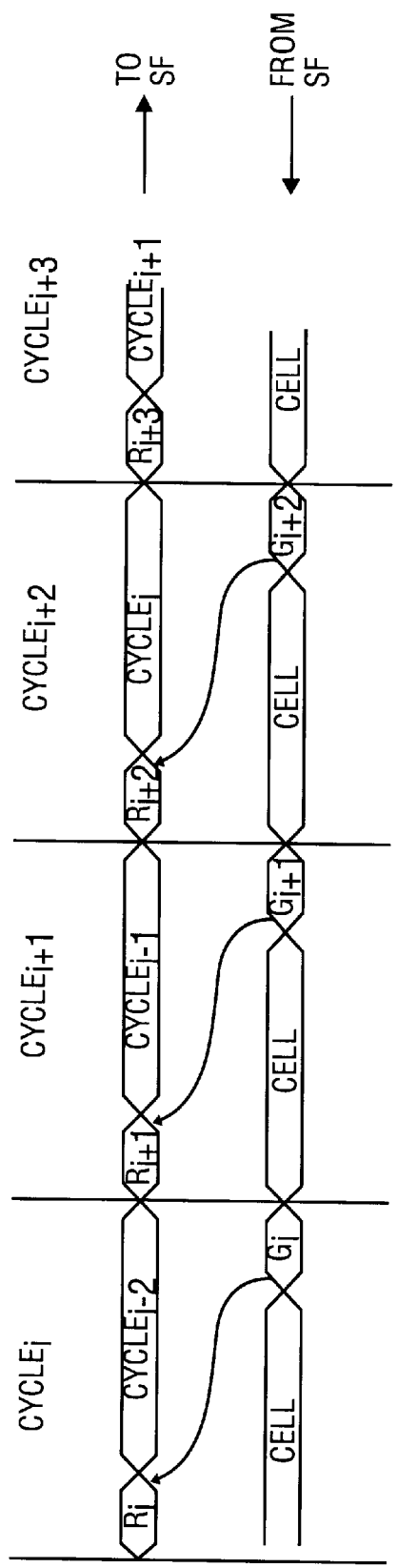
FIG. 3 is a timing diagram of traffic between the switching fabric and a line card on a single cell path according to one embodiment.

FIG. 3 is a timing diagram of traffic between the switching fabric and a line card on a single cell path according to one embodiment. During a first connection cycle (cycle$_i$), a request (R$_i$) and a cell (Cell$_{i-2}$) are transmitted to the switching fabric, in that order. During the same cycle, a cell is received from the switching fabric, followed by a grant indicator (G$_i$) that corresponds to the request R$_i$. In one embodiment, there is a two clock cycle latency between the transmission of a request and the transmission of the corresponding cell. For example, assuming that grant indicator G$_i$ indicates that request R$_i$ is granted, the corresponding cell, Cell$_i$, will be transmitted in Cycle$_{i+2}$, as shown. Similarly, grant indicator G$_{i+1}$ signals grant or denial of request R$_{i+1}$ (which corresponds to Cell$_{i+1}$), grant indicator G$_{i+2}$ signals grant or denial of request R$_{i+2}$ (which corresponds to Cell$_{i+2}$) and so forth. If a grant indicator indicates that a request has been denied, then a null cell is sent on the cell path two connection cycles later. Latency between grant and cell transmission may be longer or shorter in alternate embodiments.

Figure 4:
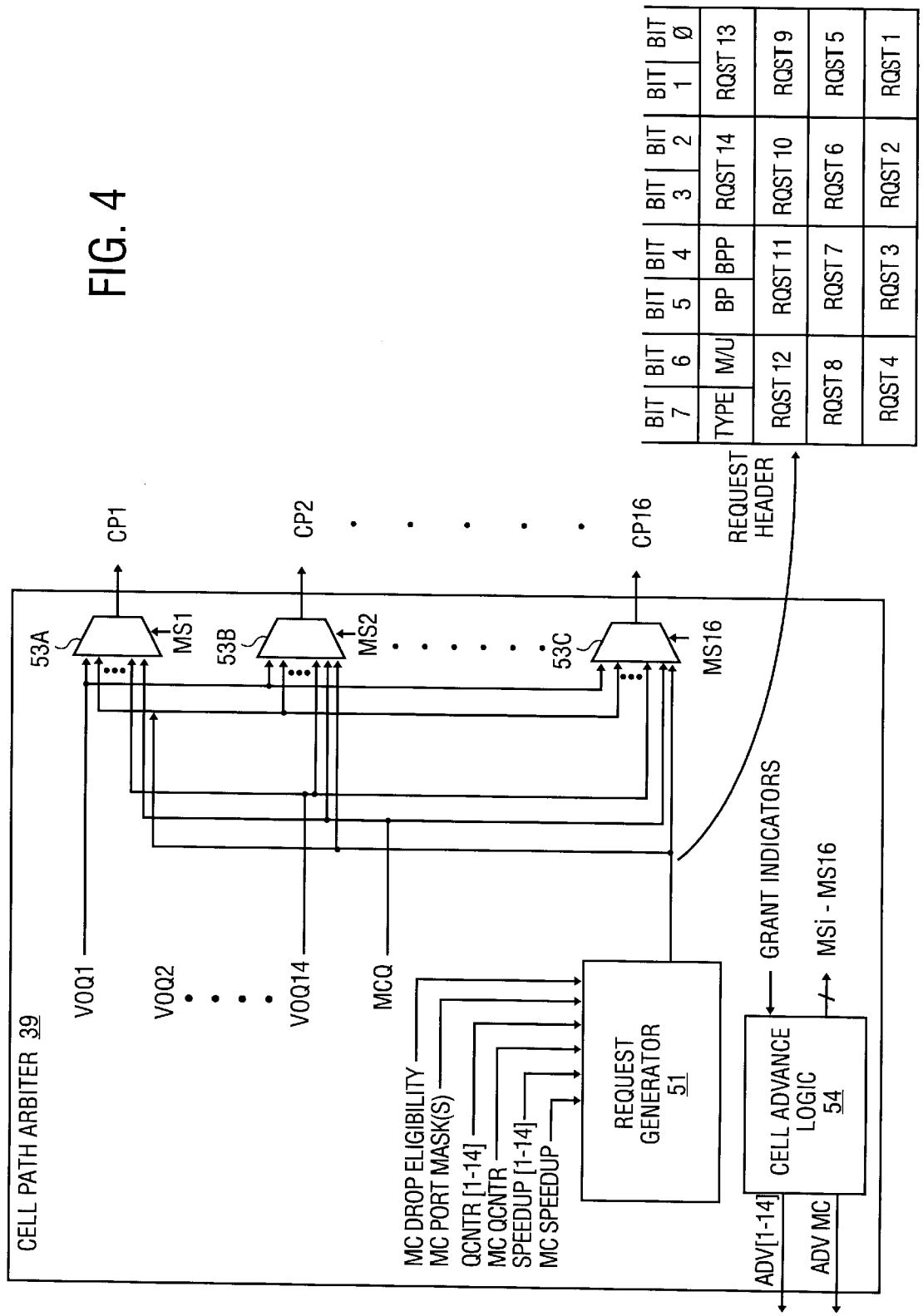
FIG. 4 illustrates a request generator and multiplexers within a cell path arbiter according to one embodiment.

FIG. 4 illustrates a request generator 51, cell advance logic 54 and multiplexers 53A–53C within the cell path arbiter 39 according to one embodiment. For each connection cycle, the request generator 51 generates a separate request header to be output onto each of the sixteen cell paths (CP1–CP16) via a respective one of the multiplexers 53A–53C. In one implementation, each request header has the 32-bit format shown in FIG. 4, with each field having the following interpretation:

| | |
|---|---|
| Type: type of cell | 0 = null cell |
| | 1 = data cell |
| M/U: multicast request indicator | 0 = unicast request |
| | 1 = multicast request |
| BP: Back pressure indicator | 0 = congestion in egress queue |
| | 1 = no congestion in egress queue |
| BPP: Odd parity over BP field | |
| RQST1–14: 2-Bit request encoding, each for a corresponding destination port | 00 = no cell |
| | 01 = secondary cell request |
| | 10 = primary cell request without speedup |
| | 11 primary cell request with speedup |

The request header is so named because it forms a header field to a cell transmitted during the same connection cycle (see FIG. 3, showing the relative transmission a request and a cell within the same connection cycle). However, except for the type field, which indicates whether the appended cell is null, and the BP and BPP fields, which indicate whether the egress queue in the line card is congested, all the information in the request header pertains to a cell to be forwarded in a later connection cycle and not to the appended cell.

As shown in FIG. 4, the request generator 51 relies upon a number of different input signals to generate request headers, including the DERs and multicast port masks for up to sixteen multicast cells, the queue counters for the multicast queue (MC QCNTR) and the virtual output queues (QCNTR[1–14]), and the speedup signals for the multicast queue (MC SPEEDUP) and the virtual output queues (SPEEDUP[1–14]). The multicast queue counter and the virtual output queue counters indicate how many cells are queued in the multicast queue and the virtual output queues, respectively. From the standpoint of the request generator 51, only the first sixteen cells in a given queue are of consequence during a particular connection cycle, because only sixteen request headers are generated. The first sixteen cells in a queue (or, if less than sixteen, the number indicated by the corresponding queue counter) are referred to herein as the "leading cells" in that queue and only the leading cells are available to be dequeued during a given connection cycle.

The cell advance logic 54 receives grant indicators from the cell paths CP1–CP16 and issues advance signals, ADV [1–14] and ADV MC in response. As discussed above in reference to FIG. 2, the advance signals cause cells to be dequeued from the virtual output queues and the multicast queue, permitting other cells to advance in those queues. The cell advance logic 54 issues multiplexer select signals (MS1–MS16) to control the output of multiplexers 53A–53C depending upon which forwarding requests have been granted. During part of each connection cycle, the multiplexer select signals are used to select the request generator 51 as the data source for each of the multiplexers 53A–53C to allow request headers to be transmitted on each of the cell paths CP1–CP16. In an implementation in which there is a latency between grant of a forwarding request and the time that a corresponding cell is transmitted to the switching fabric, temporary storage such as a first-in, first-out (FIFO) buffer may be provided to buffer cells that have been dequeued from the ingress queues in an earlier connection cycle. Alternatively, cells may be left on their respective queues until time for transmission to the switching fabric.

Figure 5:
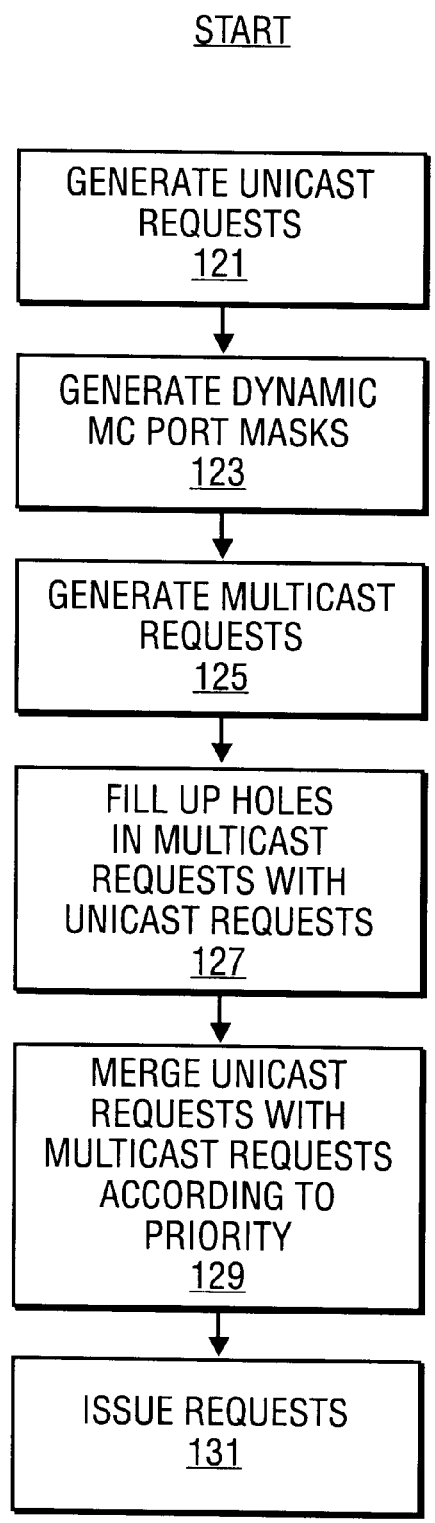
FIG. 5 illustrates request header generation according to one embodiment.

FIG. 5 illustrates request header generation according to one embodiment. In block 121, a set of unicast requests are generated based on the queue counters and speedup signals for each of the virtual output queues. In block 123, a dynamic multicast port mask is generated for each leading multicast cell. As discussed below, the dynamic multicast port mask is generated by masking off destination port designations in the multicast port masks of drop eligible multicast cells according to congestion information received from the SAR 33 (i.e., the speedup signals). Alternatively, the congestion information may be received from the switching fabric (e.g., back pressure bits from destination line cards may be included in the grant indicator). At block 125, multicast requests are generated based on the dynamic multicast port masks. At block 127, holes in the multicast requests (i.e., unused destination ports in the request header) are filled with unicast requests, if any. At block 129, the unicast and multicast requests are merged to generate finalized request headers according to the relative priority between unicast and multicast requests. At block 131, the finalized request headers are issued to the switching fabric via the cell paths.

Figure 6:
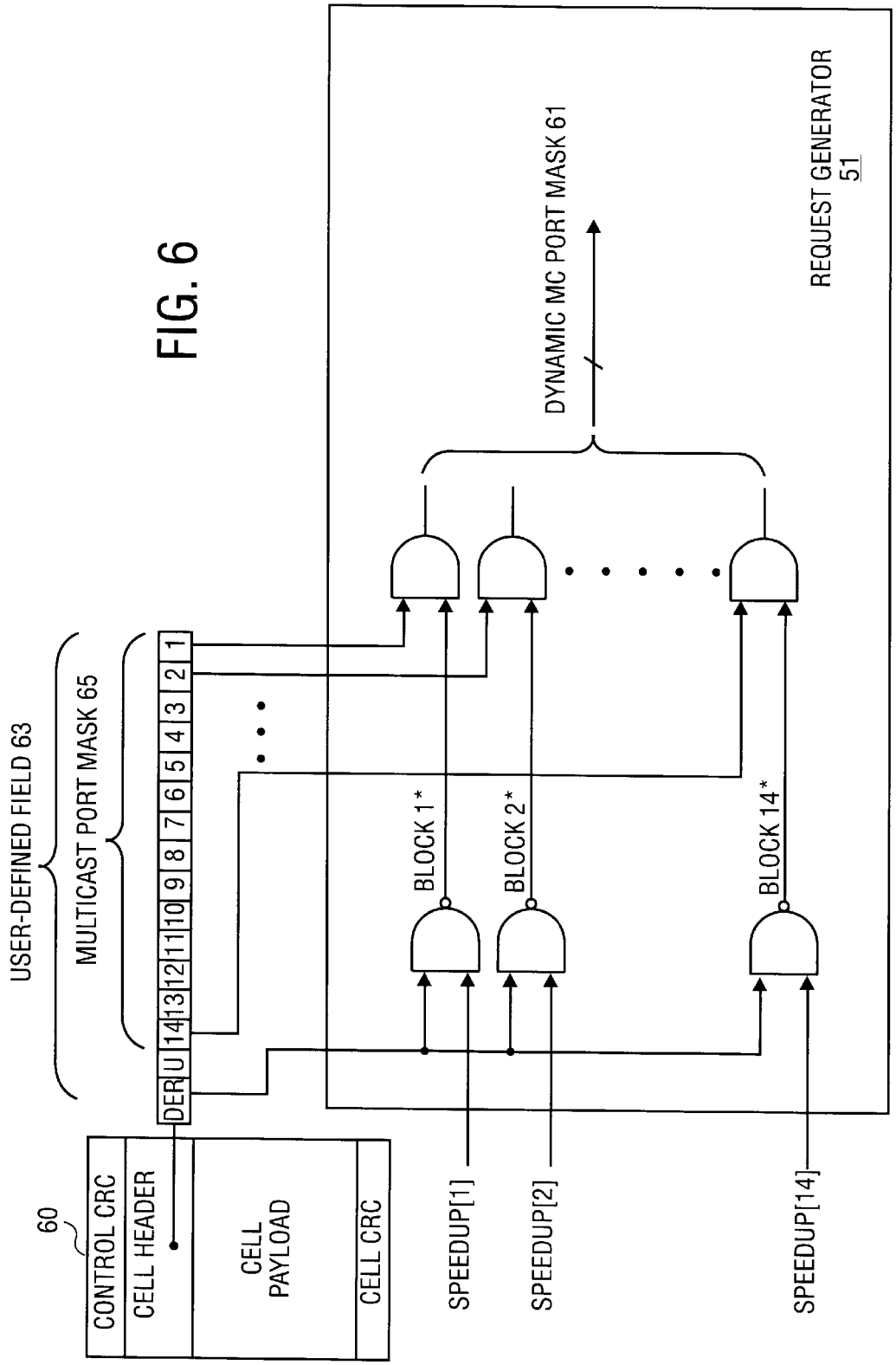
FIG. 6 illustrates generation of a dynamic multicast port mask in the request generator according to one embodiment.

FIG. 6 illustrates generation of a dynamic multicast port mask 61 in the request generator 51 according to one embodiment. A two-byte user defined field 63 within the cell header of a queued multicast cell 60 includes a fourteen-bit multicast port mask 65 and a DER bit (another bit, marked 'U' is unused). In one implementation, each set bit in the multicast port mask 65 indicates that the cell is destined for the destination port that corresponds to the bit's position within the mask. For example, if the bit in position 3 of the mask is equal to '1,' then the cell is destined for port 3. If the DER is 1, the cell is drop eligible. Otherwise the cell is not drop eligible. As shown if FIG. 6, the DER is used to gate each of the speedup signals for the virtual output queues, SPEEDUP[1–14]. If a cell is drop eligible (i.e., DER>0), and if speedup is asserted for a given destination port, then a block signal is asserted to mask off the corresponding bit from the muiticast port mask. The asterisk at the end of the block signals (Block1*, Block2*, . . . , Block14*), indicates that the signal is active at a low logical level. Thus, each bit, i, of the dynamic multicast port mask can be expressed as follows:

Dynamic port mask bit$_i$=Multicast port mask bit$_i$ * not(speedup [i]* (DER>Threshold))

A significant characteristic of the dynamic port mask generation circuitry is that it does not disturb the user defined field 63 in the queued multicast cell: Consequently, if a one or more multicast destinations are masked off in a forwarding request that is denied, the multicast destinations may be restored in a subsequent forwarding request if the destination ports become uncongested. Thus, generating the dynamic port mask in a manner that is non-destructive to the original multicast port mask permits destination ports to be masked and restored dynamically in response to cycle-to-cycle changes in congestion status. Also, if a forwarding request having masked destinations is granted, the multicast cell is dequeued from the multicast queue and sent to the remaining destinations indicated by the dynamic multicast port mask. Consequently, other cells in the multicast queue are advanced and head-of-line blocking is avoided for drop eligible cells. In this way, when congestion is detected at destination ports in the switching device, delivery of non-critical traffic to the congested ports is curtailed, effecting real-time diversion of switching resources to higher priority traffic (i.e., non-drop eligible traffic).

Figure 7:
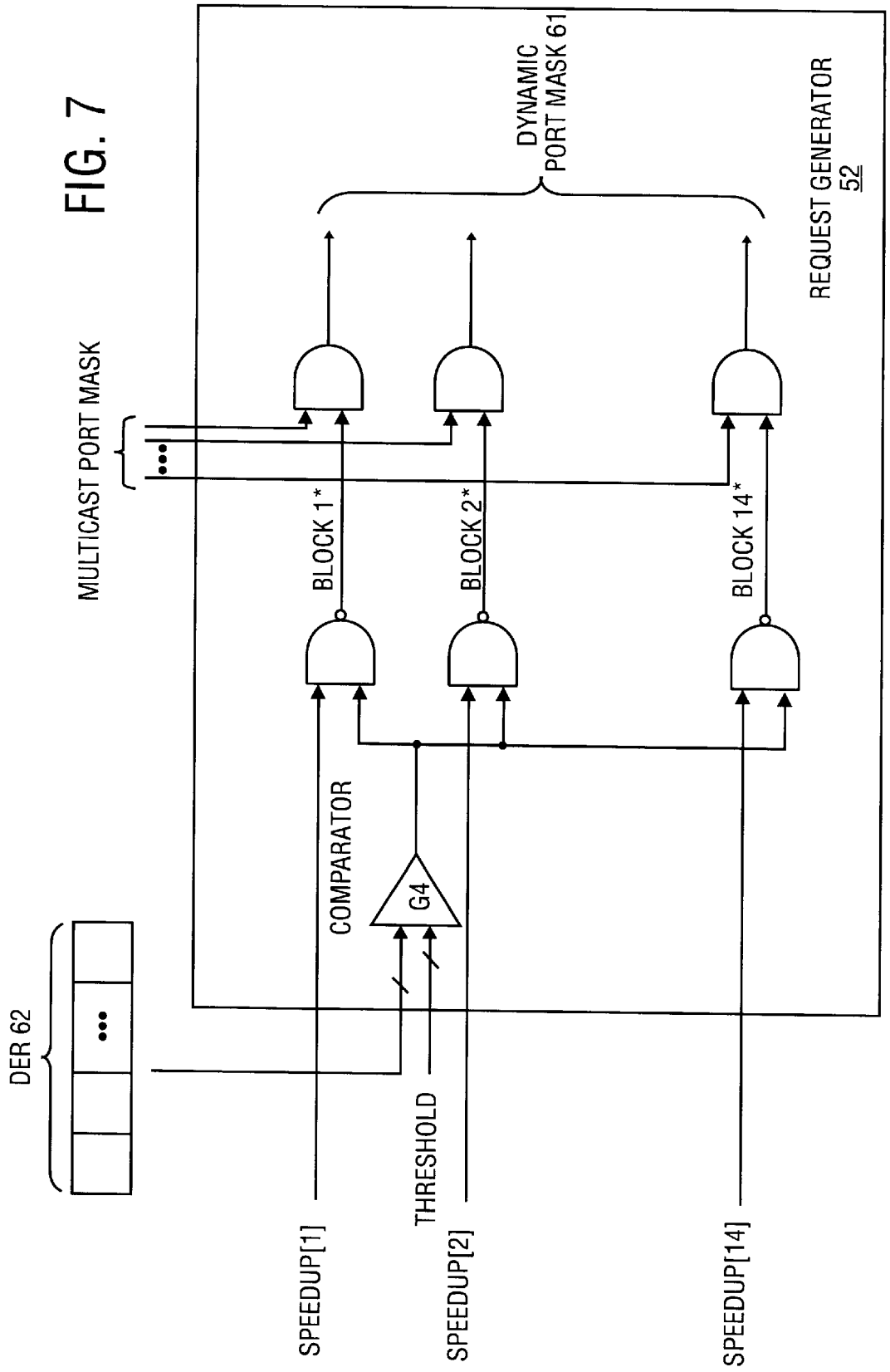
FIG. 7 illustrates an embodiment of a request generator for handling a multiple-bit drop eligible rank (DER)

FIG. 7 illustrates an embodiment of a request generator 52 for handling a multiple-bit DER 62 supplied from a queued multicast cell. In this embodiment, the request generator 52 includes a comparator 64 for comparing the DER 62 against a threshold value (THRESHOLD). If the DER exceeds the threshold, the comparator outputs a high logical signal causing the block signals (Block1*, Block2*, . . . , Block14*) to be asserted to mask all bits of the multicast port mask for which the corresponding speedup signals are asserted. The threshold value against which the DER 62 is compared may be predetermined (e.g., by operator configuration), or adaptively determined. For example, the DER may be allowed to range between preconfigured maximum and minimum values in response to traffic conditions within the switch.

Figure 8:
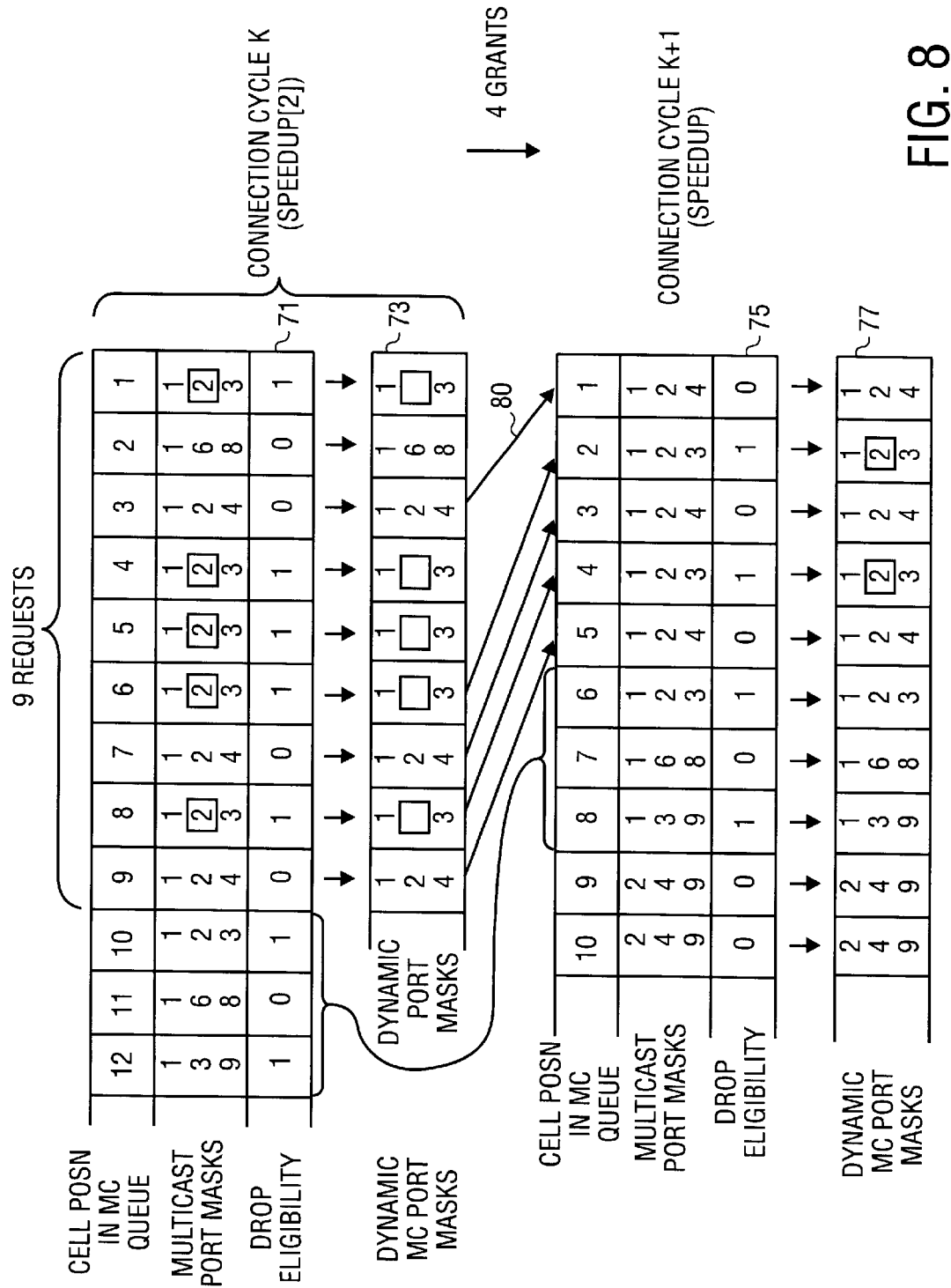
FIG. 8 illustrates an example of dynamic delisting and relisting of destination ports for cells queued in a multicast queue.

FIG. 8 illustrates an example of dynamic delisting and relisting of destination ports for cells queued in a multicast queue. During connection cycle k, twelve cells are queued in the multicast queue as shown at 71. Nine requests are issued to the switching fabric on behalf of the multicast queue 71 (i.e., seven requests are issued for cells queued in virtual output queues). Because the speedup signal for virtual output queue 2 (SPEEDUP[2]) is asserted, indicating that destination port 2 is congested, destination port 2 is masked in the dynamic multicast port mask of each drop eligible cell for which a request header is generated. This is illustrated in FIG. 8 by the squares around destination 2 in the multicast port masks for cells in queue positions 1, 4–6 and 8 and the empty squares in the corresponding dynamic port masks 73 for those cells. Thus, in the request header for the cells in queue positions 1, 4–6 and 8, only destination ports 1 and 3 will be included.

In this example, four grants are issued by the switching fabric, causing cells in positions 1, 2, 4 and 5 to be forwarded. No grant is issued for the cell in position 3 because that cell is destined for a congested destination port (i.e., port 2). The requests for cells in positions 1, 4 and 5 would also have been denied, but destination port 2 was delisted for those cells. Consequently, the requests for cells 1, 4 and 5 are granted, causing the cells to be dequeued and other cells to be advanced in the multicast queue 71 as shown by arrows 80.

During connection cycle k+1, the multicast queue is as shown at 75 and the speedup signal for destination port 2 is deasserted, indicating that congestion at port 2 has cleared. Consequently, destination port 2 is relisted in the dynamic port masks for cells in queue positions 2 and 4 during connection cycle k+1 (these cells were in queue positions 6 and 8 during connection cycle k). Accordingly, the dynamic port masks shown at 77 are generated. The squares around the destination port 2 for the cells in positions 2 and 4 illustrate the relisted destinations. Thus, destination ports are relisted without delay upon determination that congestion has cleared.

Having described the operations involved in dynamically delisting and relisting destination ports for data objects in a multicast queue, it should be noted that the individual operations involved may be performed by a general purpose processor programmed with instructions that cause the processor to perform the recited operations, specific hardware components that contain hard-wired logic for performing the recited operations, or any combination of programmed general purpose computer components and custom hardware components. Nothing disclosed herein should be construed as limiting the present invention to a single embodiment wherein the recited operations are performed by a specific combination of hardware components.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of reducing congestion in a network switching node, the method comprising:

masking destination port designations that correspond to congested destinations in the switching node from a destination port field included in a first packet in a multicast queue of the switching node if a drop eligibility value within the packet indicates that destination port designations may be masked; and dequeuing the first packet from the multicast queue to be forwarded to destination ports indicated by unmasked destination port designations in the destination port field, the dequeuing permitting advance of other packets in the multicast queue.

2. The method of claim 1 wherein masking destination port designations from the destination port field included in the first packet comprises:

generating a congestion mask that indicates which of a plurality of destination ports in the network switching node are congested; and combining the congestion mask with the destination port designations in the destination port field to suppress destination port designations for the destination ports that are congested.

3. The method of claim 2 wherein generating the congestion mask comprises asserting a respective speedup signal for each of a plurality of virtual output queues in the switching node that is unable to receive incoming cells at an assigned rate, each speedup signal forming a portion of the congestion mask.

4. The method of claim 2 wherein generating the congestion mask comprises generating the congestion mask based on congestion information received from the destination ports.

5. The method of claim 1 further comprising:

issuing a request to a switching fabric included in the switching node to forward the first packet to the destination ports indicated by the unmasked destination port designations in the destination port field;

receiving a grant indication from the switching fabric granting the request to forward the first packet to the destination ports indicated by the unmasked destination port designations; and wherein said dequeuing the first packet from the multicast queue is performed in response to the grant indication.

6. The method of claim 5 wherein masking destination port designations comprises generating a dynamic destination port mask by combining the destination port designations with a congestion mask that indicates which of a plurality of destination ports are congested, and wherein issuing a request to the switching fabric comprises transmitting information representative of the dynamic destination port mask to the switching fabric.

7. The method of claim 1 wherein masking destination port designations comprises generating a dynamic destination port mask by combining the destination port designations with a congestion mask that indicates which of a plurality of destination ports are congested, the destination port designations in the destination port field in the first packet remaining unchanged.

8. The method of claim 1 further comprising unmasking a previously masked destination port designation from a destination port field included in a second packet in the multicast queue in response to determining that a previously congested destination port that corresponds to the previously masked destination port designation has become uncongested.

9. The method of claim 1 wherein the first packet is a fixed length cell.

10. The method of claim 1 wherein the network switching node is an asynchronous transfer mode (ATM) switch.

11. The method of claim 1 further comprising determining whether the drop eligibility value exceeds a predetermined threshold, the drop eligibility value indicating that destination port designations may be masked if the drop eligibility value exceeds the predetermined threshold.

12. A method of reducing congestion in a network switching node, the method comprising:

generating a congestion mask that indicates which of a plurality of destination ports in the switching node are congested;

combining the congestion mask with a destination port field included in a packet in a multicast queue of the switching node to mask destination port designations in the destination port field that are indicated by the congestion mask to be congested if a drop eligibility field within the packet indicates that destination port designations are permitted to be masked; and dequeuing the packet from the multicast queue to be forwarded to destination ports in the network switching node indicated by destination port designations in the destination port field not masked by said combining the congestion mask with the destination port field.

13. The method of claim 12 wherein combining the congestion mask with the destination port field comprises generating a first dynamic destination port mask in which the destination port designations in the destination port field that are indicated by the congestion mask to be congested are masked if the drop eligibility field indicates that destination port designations are permitted to be masked, the destination port field being undisturbed by the combining with the congestion mask.

14. The method of claim 13 further comprising generating a second dynamic destination port mask based on a combination of an updated congestion mask with the destination port field, the updated congestion mask indicating that at least one previously congested destination port has become uncongested so that a corresponding destination port designation that was masked in the first dynamic destination port mask is unmasked in the second dynamic destination port mask.

15. The method of claim 12 wherein the packet is a fixed length cell.

16. The method of claim 12 wherein the network switching node is an asynchronous transfer mode (ATM) switch.

17. An apparatus comprising:

a multicast queue to store a data packet destined for multiple network destinations; and port mask generation circuitry to combine congestion information with a destination port field included in the data packet and a drop eligibility field included in the data packet to generate a dynamic destination port mask that indicates destination ports in a network switching node to which the data packet is to be forwarded, at least one destination port designation in the destination port field being masked in the dynamic destination port mask if the congestion information indicates that a corresponding one of the destination ports is congested and if the drop eligibility field contains a value that exceeds a predetermined threshold.

18. The apparatus of claim 17 wherein the apparatus is a line card for use in the network switching node, the line card further comprising an interface to receive a network transmission line.

19. The apparatus of claim 17 further comprising a plurality of virtual output queues to store data packets destined for respective ones of the destination ports, and wherein the congestion information is generated based on which of the plurality of virtual output queues is unable to receive incoming data packets at an assigned rate.

20. The apparatus of claim 17 further comprising an interface to couple the apparatus to a switching fabric in the network switching node, and wherein the congestion information is received from the switching fabric via the interface.

21. The apparatus of claim 17 wherein the data packet is a fixed-length cell.

22. A network switching node comprising:
a switching fabric; and
a plurality of line cards coupled to the switching fabric, each of the line cards constituting at least one destination port in the network switching node, each of the line cards including
a multicast queue to store a data packet destined for multiple network destinations, and
port mask generation circuitry to combine congestion information with a destination port field included in the data packet and a drop eligibility field included in the data packet to generate a dynamic destination port mask that indicates to which of the destination ports in the network switching node the data packet is to be forwarded, at least one destination port designation in the destination port field being masked in the dynamic destination port mask if the congestion information indicates that a corresponding one of the destination ports is congested and if the drop eligibility field contains a value that exceeds a predetermined threshold.

23. The network switching node of claim 22 wherein the network switching node is an asynchronous transfer mode (ATM) switch.

24. An apparatus comprising:
a multicast queue to store a data packet destined for multiple network destinations; and
port mask generation circuitry to combine congestion information with a destination port field associated with the data packet and a drop eligibility field associated with the data packet to generate a dynamic destination port mask that indicates destination ports in a network switching node to which the data packet is to be forwarded, wherein a destination port designation in the destination port field is masked in the dynamic destination port mask if the congestion information indicates that a corresponding one of the destination ports is congested and if the drop eligibility field contains a value that indicates that the packet is eligible to be dropped.

25. The apparatus of claim 24 wherein the apparatus is a line card for use in the network switching node, the line card further comprising an interface to receive a network transmission line.

26. The apparatus of claim 24 further comprising a plurality of virtual output queues to store data packets destined for respective ones of the destination ports, and wherein the congestion information is generated based on which of the plurality of virtual output queues is unable to receive incoming data packets at an assigned rate.

27. The apparatus of claim 24 further comprising an interface to couple the apparatus to a switching fabric in the network switching node, and wherein the congestion information is received from the switching fabric via the interface.

28. The apparatus of claim 24 wherein the data packet is a fixed-length cell.

29. An apparatus for reducing congestion in a network switching node, the apparatus comprising:
means for masking destination port designations that correspond to congested destinations in the switching node from a destination port field associated with a first packet in a multicast queue of the switching node if a drop eligibility value within the packet indicates that destination port designations may be masked; and
means for dequeuing the first packet from the multicast queue to be forwarded to destination ports indicated by unmasked destination port designations in the destination port field, the dequeuing permitting advance of other packets in the multicast queue.

30. The apparatus of claim 29 wherein the means for masking destination port designations from the destination port field associated with a first packet further comprises:
means for generating a congestion mask that indicates which of a plurality of destination ports in the network switching node are congested; and
means for combining the congestion mask with the destination port designations in the destination port field to suppress destination port designations for the destination ports that are congested.

31. The apparatus of claim 30 wherein the means for generating the congestion mask further comprises means for asserting a respective speedup signal for each of a plurality of virtual output queues in the switching node that is unable to receive incoming cells at an assigned rate, each speedup signal forming a portion of the congestion mask.

32. The apparatus of claim 30 wherein the means for generating the congestion mask further comprises means for generating the congestion mask based on congestion information received from the destination ports.

33. The apparatus of claim 29 further comprising:
means for issuing a request to a switching fabric included in the switching node to forward the first packet to the destination ports indicated by the unmasked destination port designations in the destination port field; and
means for receiving a grant indication from the switching fabric granting the request to forward the first packet to the destination ports indicated by the unmasked destination port designations, wherein said dequeuing the first packet from the multicast queue is performed in response to the grant indication.

34. The apparatus of claim 33 wherein the means for masking destination port designations further comprises means for generating a dynamic destination port mask by combining the destination port designations with a congestion mask that indicates which of a plurality of destination ports are congested, and wherein the means for issuing a request to the switching fabric further comprises means for transmitting information representative of the dynamic destination port mask to the switching fabric.

35. The apparatus of claim 29 wherein the means for masking destination port designations further comprises means for generating a dynamic destination port mask by combining the destination port designations with a congestion mask that indicates which of a plurality of destination ports are congested, the destination port designations in the destination port field associated with the first packet remaining unchanged.

36. The apparatus of claim 29 further comprising means for unmasking a previously masked destination port designation from a destination port field associated with a second packet in the multicast queue in response to determining that a previously congested destination port that corresponds to the previously masked destination port designation has become uncongested.

37. The apparatus of claim 29 wherein the first packet is a fixed length cell.

38. The apparatus of claim 29 wherein the network switching node is an asynchronous transfer mode (ATM) switch.

39. The apparatus of claim 29 further comprising means for determining whether the drop eligibility value indicates that the packet is eligible to be dropped, the drop eligibility value indicating that destination port designations may be masked if the drop eligibility value indicates that the packet is eligible to be dropped.

* * * * *